Feb. 14, 1950 H. G. FLOYD 2,497,595
APPARATUS FOR DETERMINING ECCENTRICITY
IN TUBULAR SECTIONS
Filed May 29, 1945 4 Sheets-Sheet 1
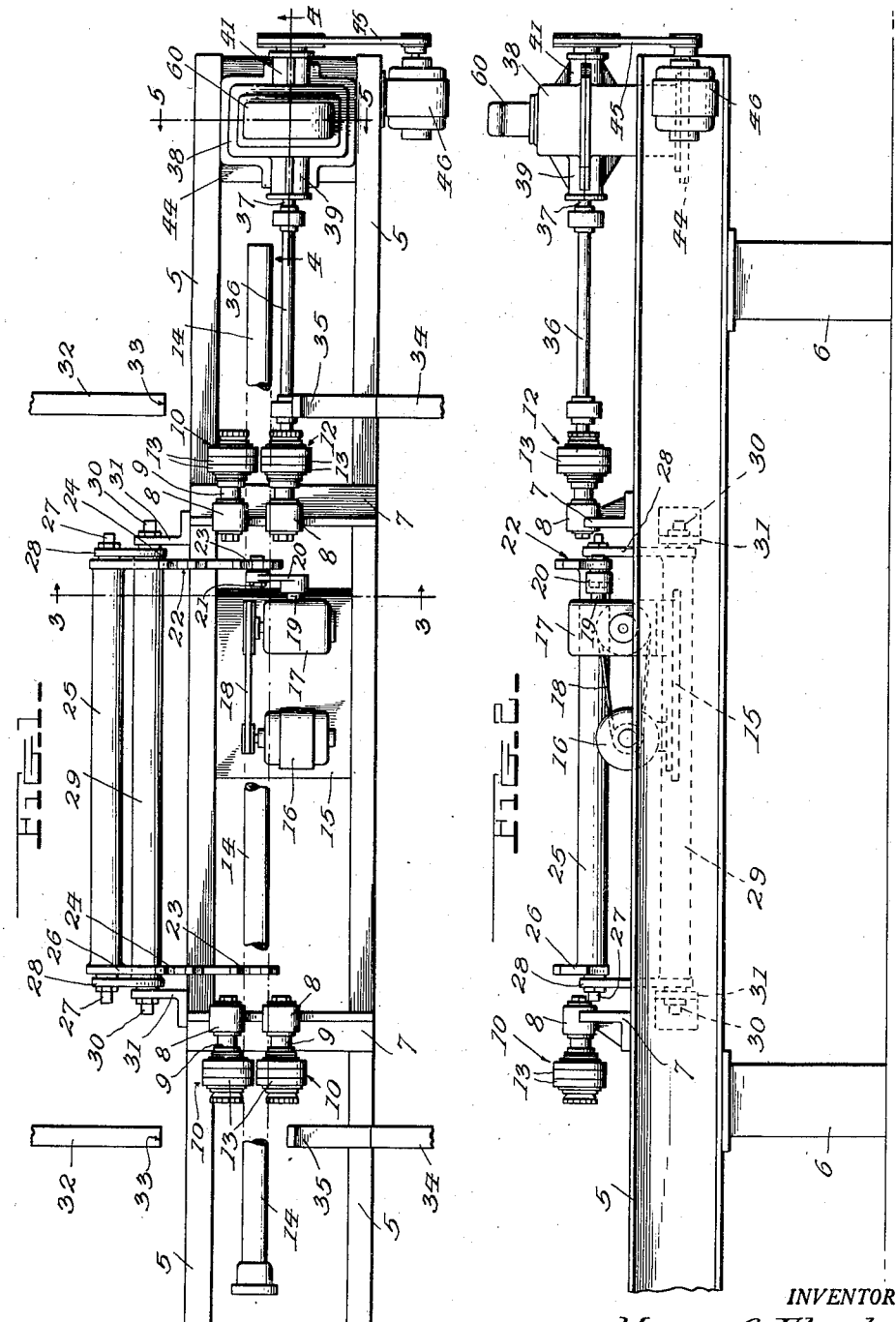
INVENTOR.
Henry G. Floyd.
BY
Mason, Porter & Diller
ATTORNEYS

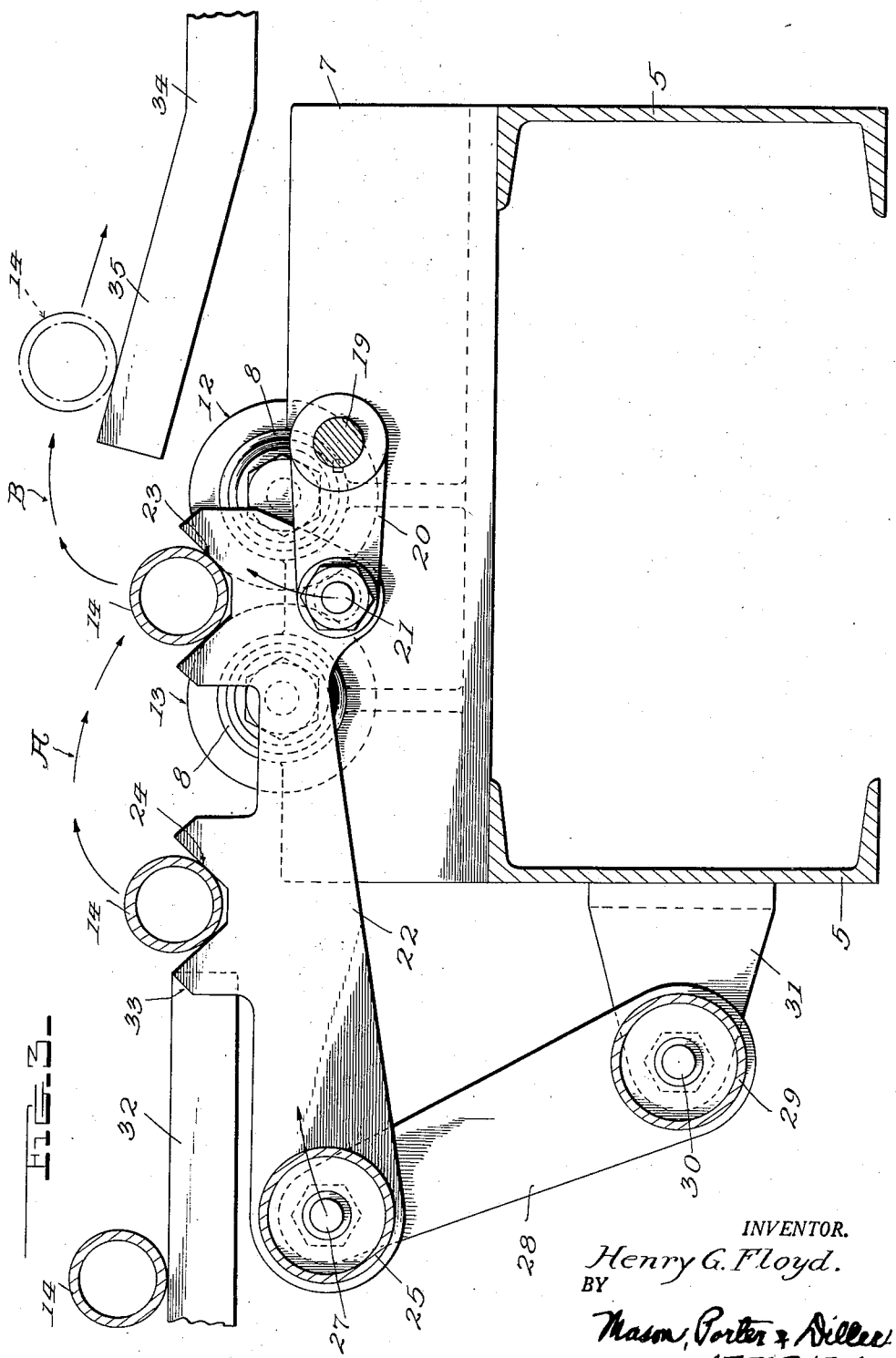

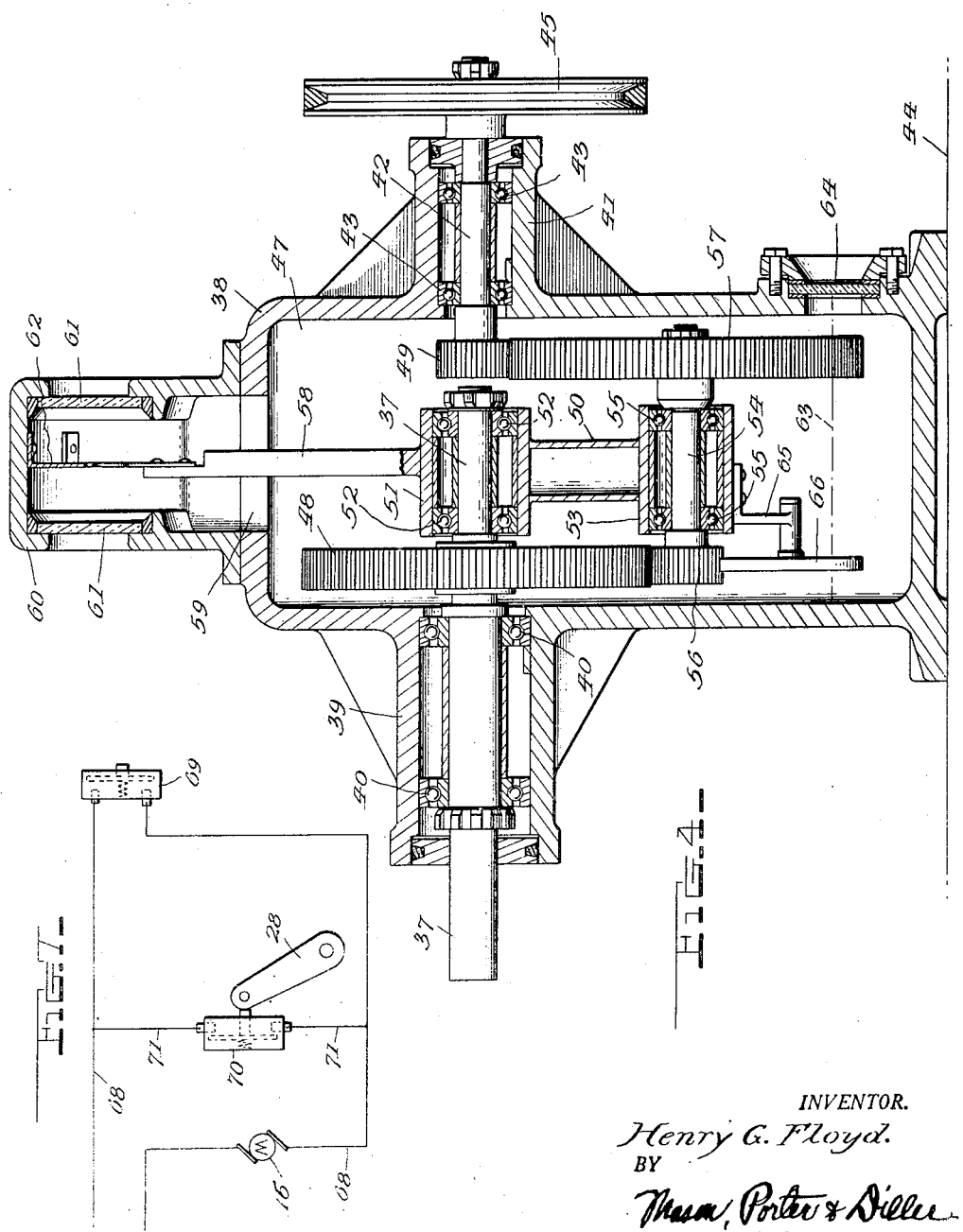

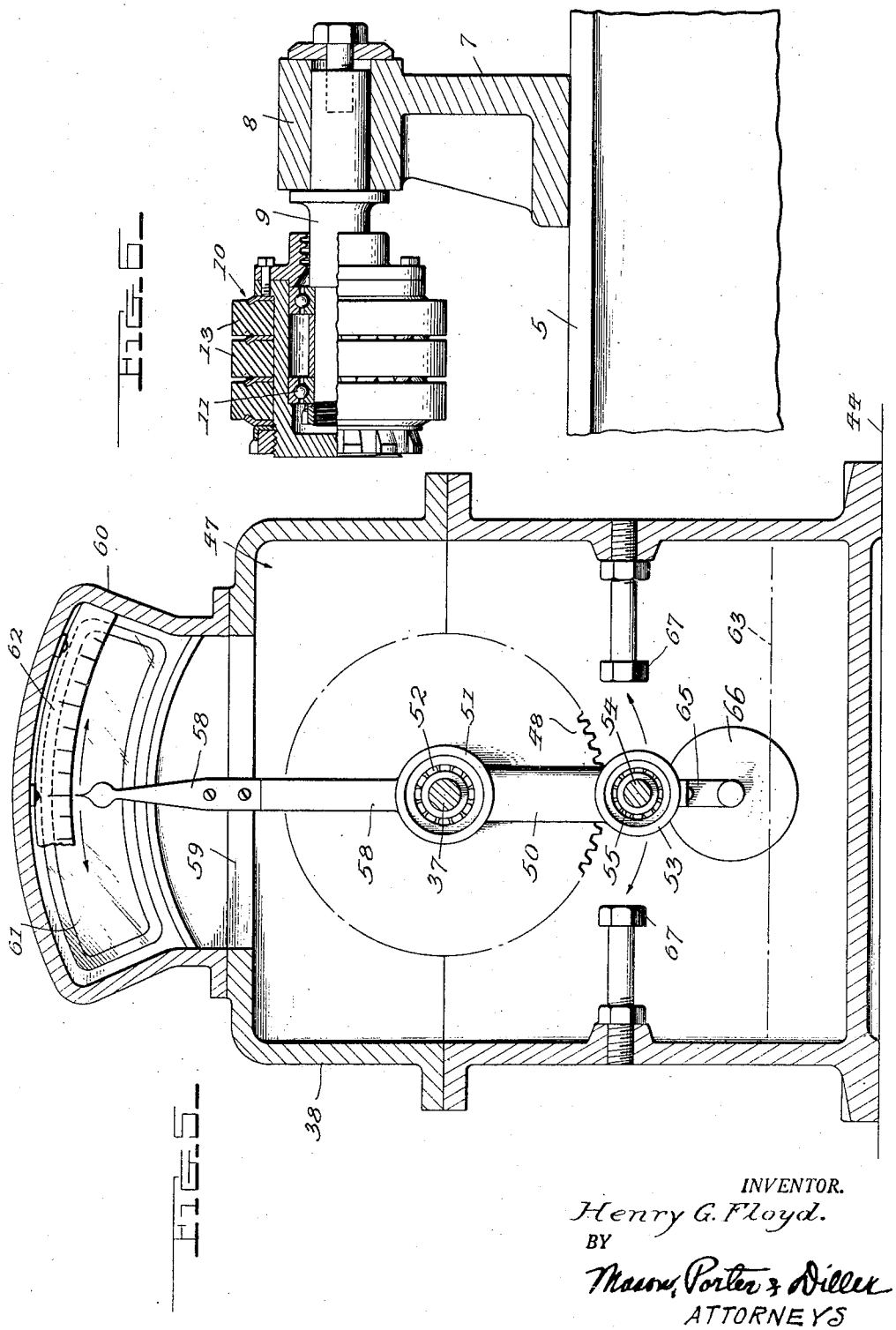

Patented Feb. 14, 1950

2,497,595

UNITED STATES PATENT OFFICE 2,497,595

APPARATUS FOR DETERMINING ECCENTRICITY IN TUBULAR SECTIONS

Henry G. Floyd, Birmingham, Ala., assignor to McWane Cast Iron Pipe Company, Birmingham, Ala., a corporation of Alabama Application May 29, 1945, Serial No. 596,484

6 Claims. (Cl. 73—65)

The invention relates generally to testing apparatus and primarily seeks to provide a novel apparatus for determining eccentricity in tubular sections, such as cast iron pipe, or in other words for testing such sections to determine if the inner and outer surfaces are out of concentric relation.

In the manufacture of cast iron pipe it is required that wall thicknesses be substantially uniform throughout the length of the pipe, or in other words, that the inner and outer surfaces be concentric within certain tolerances. However, because of inaccuracies in the setting of the cores, or core deflections greater or less than those planned for during the pouring of the molds, it sometimes happens that an amount of eccentricity greater than is permissible is found to be present in the finally cast product. The amount of eccentricity is, of course, determined in wall thickness in a pipe at points 180° apart, and it is the purpose of the present invention to provide an apparatus for quickly determining variations in wall thicknesses in cast iron pipe or comparable tubular sections.

It will be readily understood that the variation in wall thickness at the middle portion of a pipe will be in proportion to the variation in weight of the metal on two sides of a plane through the axis of the pipe and at right angles to the points of minimum and maximum wall thickness. If the pipe is placed on an anti-friction roll support and rotated about its own axis, the torque required to revolve the same during one revolution will vary as said wall thicknesses vary, and it is an object of the present invention to provide a novel apparatus of the character stated in which there are included an anti-friction roll support for a pipe, means for rotating the pipe about its axis, and means for visually indicating torque variations during and incidental to the turning of the pipe.

In its more detailed nature the invention seeks to provide an apparatus of the character stated in which there are included a set of spaced anti-friction idler rolls and a set of spaced rolls including a driver roll, said roll sets each providing a crotch in which to receive an end of a pipe-to-be-tested so that said pipe will be supported by said roll sets and rotated by said driven roll, a driver shaft coupled in drive relation with the driver roll, a rocker arm mounted for swinging movement about an axis aligned with the axis of the driver shaft, a power input shaft coaxial with the driver shaft, a shaft carried by the rocker arm with its axis in parallel spaced relation to the arm pivot and having a gear on each end thereof, a gear on each of the driver and power input shafts each meshing with one of the gears on the rocker arm carried shaft, and means for indicating the degree of deflection from the vertical of the rocker arm incidental to the transmitting of rotary motion from the power input shaft to the driver shaft.

Another object of the invention is to provide an apparatus of the character stated in which the rocker arm and the gear couples connecting the power input shaft and the driver shaft are mounted within a housing including a sight window having a position marker viewable therethrough and in which the indicating means comprises an indicator finger projecting from the rocker arm in position for being viewed through said window with relation to said marker.

Another object of the invention is to provide in apparatus of the character stated, novel means for moving pipe-to-be-tested onto the supporting rolls, and tested pipe from said rolls.

With the above and other objects in view that will hereinafter appear, the nature of the invention will be more clearly understood by reference to the following detailed description, the appended claims, and the several views illustrated in the accompanying drawings.

In the drawings:

Figure 1 is a plan view illustrating an apparatus embodying the invention.

Figure 2 is a side elevation illustrating the parts shown in Figure 1.

Figure 3 is an enlarged detail vertical cross section taken on the line 3—3 on Figure 1.

Figure 4 is an enlarged fragmentary vertical longitudinal section taken on the line 4—4 on Figure 1.

Figure 5 is an enlarged detail vertical cross section taken on the line 5—5 on Figure 1.

Figure 6 is an enlarged detail longitudinal section illustrating one of the pipe supporting idler rolls.

Figure 7 is a diagrammatic view illustrating one manner of automatically controlling the pipe loading and unloading devices to operate through single cycles.

In the apparatus herein disclosed as an example of embodiment of the invention, there is included a frame structure comprising two longitudinal channel beams 5 disposed in spaced parallel relation and supported on standards 6, said beams being connected by transversely disposed, longitudinally spaced frame members 7. Three idler rolls 10 are mounted on the shafts 9 about anti-friction bearings 11, and one driver roll 12 is similarly mounted on the remaining shaft 9 in the position illustrated in Figures 1 and 2 of the drawings. All of the rolls are equipped with friction surfaces 13 which may comprise a plurality of rubber rings as indicated in Figure 6, and the rolls are arranged in sets of two, each set providing a rest crotch in which to receive an end portion of a pipe 14. See Figures 1 and 3.

A table 15 is mounted between and supported by the beams 5 between the cooperating sets of rolls 10 and 12, and the table supports a motor 16 and a reduction gearing unit generally designated 17 which is driven by pulley and belt connections 18 from said motor and has its slow speed output shaft 19 equipped with a crank arm 20. See Figures 1 and 3.

The driver crank 20 has its free end pivotally connected as in Figure 1 to a side arm member 22 having two spaced pipe rest crotches 23 and 24 formed in the upper surface thereof in the manner best illustrated in Figure 3. The arm 22 is welded or otherwise secured to one end of the sleeve 25 having a similarly notched arm 26 secured at its other end. It will be apparent by reference to Figures 1, 2 and 3 of the drawings that the arms 22 and 26 and the sleeve 25 form a rigid, U-shaped frame.

The sleeve 25 is pivotally secured at its ends as at 27 between the free ends of two arms 28, said arms being welded to the opposite ends of a sleeve 29 which is pivotally mounted as at 30 between brackets 31 secured to the adjacent side beam 5 in the manner best illustrated in Figures 1 and 3.

Pipe roll-ways or supports 32 are provided and are disposed in the manner illustrated in Figures 1 and 3 with their discharge ends 33 in position for delivering pipe 14 into the receiving crotches 24 of the arms 22 in the manner clearly illustrated in Figure 3. Feed-away supports 34 also are provided, and these include downwardly inclined receiving portions 35 which are disposed to receive pipe 14 as they are discharged from the apparatus by the arms 22 and 26 in a manner to be described hereinafter.

The driver roll 12 is connected as at 36 with the slow speed output shaft 37 of a tester unit including a housing 38 having a bearing sleeve 39 in which the shaft 37 is rotatably mounted in anti-friction bearings 40. See Figures 1 and 4. The housing 38 also is equipped with a bearing sleeve 41 which is axially aligned with the sleeve 39 and in which a high speed input shaft 42 is rotatably mounted in anti-friction bearings 43. The housing is mounted on a table 44 which is suitably supported by and between the side beams 5.

It will be apparent by reference to Figures 1, 2 and 4 of the drawings that the power input shaft 42 is driven through pulley and belt connections 45 from a motor 46 supported on one of the side beams 5.

Both shafts 37 and 42 have end portions projecting into the interior chamber 47 of the housing, and the shaft 37 has a large gear 48 fixed thereon within said chamber. The portion of the power input shaft 42 projected into the housing chamber 47 is equipped with a small driver pinion 49.

A rocker arm 50 is mounted uprightly in the housing in the manner clearly illustrated in Figures 4 and 5. This rocker arm has a bearing sleeve 51 which is mounted about anti-friction bearings 52 on the inward extension of the shaft 37, and the depending portion of said arm is equipped with a bearing sleeve 53 in which an idler shaft 54 is mounted in anti-friction bearings 55. The shaft 54 is equipped at one end with a driver pinion 56 which meshes with the previously mentioned large gear 48, and at its other end said idler shaft carries a large gear 57 to which rotation is imparted by the previously mentioned driver pinion 49.

An indicator finger portion 58 projects upwardly from the rocker arm hub 51 and extends through an opening 59 in the top of the housing and into the interior of a hollow cap member 60 secured over said opening. The cap member is equipped with windows 61 as shown in Figures 4 and 5, and the indicator finger 58 and a cooperating suitably calibrated scale plate 62 stationarily mounted within the hollow cap member 60 can be viewed through said windows.

A quantity of oil 63 is maintained in the bottom of the housing 38 and is viewable through a window 64 provided in the housing side wall. A bracket member 65 is secured to and depends from the lowermost bearing sleeve 53 of the rocker arm, and said bracket rotatably supports an oiler disk 66, the lower portion of which dips into the oil 63 and the upper portion of which engages with the driver pinion 56. By this means, the gear couple 48, 56 is suitably lubricated, and it will be apparent that the gear couple 49, 57 is suitably lubricated by reason of the fact that the large gear 57 dips into the oil 63.

It will be apparent by reference to Figure 3 of the drawings that the pipe 14 which are to be tested may be moved into position by operation of the arms 22 and 26, and after the testing of each pipe is completed, the tested pipe can be removed from the rolls by the same arms. It will be apparent that when the apparatus is in operation, the pipe to be tested can be rolled by hand over the supports 32 and into the receiving notches 24 of the arms 22 and 26, and on each complete revolution of the shaft 19 the crank arm 20 will function to move the arms 22 and 26 from the position illustrated in Figure 3 through a complete cycle of movement effective to deposit the tested pipe 14 onto the inclined feed-away support portions 35 from the arm crotches 23, and move the next pipe to be tested onto the roll sets 10, 10 and 10, 12. In other words, each pipe to be tested is moved by the arm notches 24 onto the supporting and turning rolls as indicated at A in Figure 3, and each tested pipe is moved by the arm notches 23 from the rolls onto the feed-away inclines 35 as indicated at B in said figure. In this handling of the pipe, the free ends of the arms 22, 26 follow the circular path of the pivotal connection thereof with the actuating crank arm 20, and the other ends of the arms, pivotally connected with the arms 28, merely rock back and forth at said connections 27.

It will be apparent that if the pipe being tested is concentric in section, the torque required to turn it will be uniform and not very great, whereas if the pipe being tested is eccentric in section the amount of torque required to turn it will be considerable and will vary in proportion to the eccentricity of the pipe section. It will be apparent by reference to Figures 4 and 5 of the drawings that the torque required to turn the shaft 37 and the test pipe to be rotated thereby will be reflected in a resistance to rotation of the gear 48. To overcome this resistance to rotation, the teeth on the pinion 56 must exert tangential force against the teeth on the gear 48. This force reacts on the rocker arm 50 and will cause it to be deflected from its normally vertical position illustrated in Figure 5. Thus the rocker arm 50 acts somewhat like a pendulum and the amount of deflection thereof from the vertical will be in proportion to the tangential force exerted by the teeth of the pinion 56 on the teeth of the gear 48. The amount of deflection of the rocker arm 50 will be indicated by the movement of the indicator finger 58 relative to the scale 62. As previously stated, if the pipe being tested is concentric in section, the torque required to turn it will be uniform and the pointer 58 will indicate only the amount of friction which has to be overcome. However, if the pipe is of uneven section, the torque required will vary as the pipe is turned and the pointer 58 will swing back and forth, and by properly calibrating the scale 62 the pointer will indicate the amount of variation in wall thickness of the pipe.

It is to be understood that the parts in the tester unit rotate continuously. It is preferred that the pipe loading and unloading devices including the separate motor 16 be operated through single cycles. This may be accomplished in any approved manner, and in Figure 7 there is diagrammatically illustrated means for controlling this loading and unloading operation. It will be apparent by reference to this figure that the motor 16 may be connected at 68 in a power and control circuit including a normally open, manually operated control switch 69 and a normally closed limit switch 70 connected as at 71 in said circuit in such position that each time the sleeve 25 or some other part movable with the U-shaped loading and unloading frame 22, 25, 26 returns to the normal position illustrated in Figure 3, it will contact the button of the switch and open the circuit to terminate the single cycle loading and unloading operation. It will be obvious that each time the switch 69 is manually closed, it will complete the circuit through the motor, and when the button of the switch 70 is depressed, it will break said circuit.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus for determining eccentricity in tubular sections, anti-friction support means for supporting a section to-be-tested and including at least two sets of rolls each composed of two laterally spaced rolls on which said section may rest, drive means connected in drive relation with one only of said rolls for continuously rotating said section about its axis, and means connected in said drive means and operable for visually indicating torque variations during and incidental to the continuous rotation of the pipe.

2. In apparatus for determining eccentricity in tubular sections, anti-friction support means for supporting a section to-be-tested and including at least two sets of rolls each composed of two laterally spaced rolls on which said section may rest, drive means connected in drive relation with one only of said rolls for continuously rotating said section about its axis, and means connected in said drive means and operable for visually indicating torque variations during and incidental to the continuous rotation of the pipe, each said roll including a plurality of removably mounted rings of yieldable material presenting a friction surface for engagement with pipe supported on the rolls.

3. In apparatus for determining eccentricity in tubular sections, anti-friction support means for supporting a section to-be-tested, drive means for continuously rotating said section about its axis, means connected in said drive means and operable for visually indicating torque variations during and incidental to the continuous rotation of the tubular section, and crank and link devices having carrier crotches thereon effective for delivering tubular sections to-be-tested serially onto said support means and simultaneously with the delivery of each said section onto said support means for removing a tested section from said support means with a predetermined testing interval intervening each placement of a tubular section on said support means and the removal of said section therefrom.

4. In apparatus for determining eccentricity in tubular sections, anti-friction support means for supporting a section to-be-tested, drive means for continuously rotating said section about its axis, means connected in said drive means and operable for visually indicating torque variations during and incidental to the continuous rotation of the section and crank and link devices having tubular section engaging carrier crotches thereon and operable through manually initiated automatically terminated cycles for removing each tested section from the rolls and replacing it with a section to-be-tested.

5. In apparatus for determining eccentricity in tubular sections, anti-friction support means for supporting a section to-be-tested, drive means for continuously rotating said section about its axis, means connected in said drive means and operable for visually indicating torque variations during and incidental to the continuous rotation of the section, and means for removing each tested section from said support means and replacing it with a section to-be-tested, said last named means being timed to operate through successive tubular section placing and removing cycles with a section testing interval intervening each two cycles and including a pair of arms having two transversely spaced sets of longitudinally aligned notches in their upper surfaces each set disposed to support a tubular section, a rollway for supporting tubular sections in position for being rolled into one said notch set, rockable crank arm means supporting the arms at one end, rotary crank means supporting the arms at their other ends, means for operating said rotary crank means, a feed-away rollway disposed to receive tested tubular sections from the other notch set, said parts being so cooperatively arranged that upon each rotation of the crank means a tested tubular section will be lifted from the anti-friction support means by said other notch set and deposited onto the feed-away rollway and a tubular section to-be-tested will be lifted by said one notch set and deposited on said anti-friction support means, and means for causing the tubular section removing and replacing means to operate through manually initiated automatically terminated cycles and comprising an electric motor in said means for operating the rotary crank means and a control circuit therefor having a manually operable circuit closing switch and a normally closed switch automatically opened by contact therewith of a part returning to normal position after the depositing of the tested and untested tubular sections on the anti-friction support means and feed-away rollway.

6. In apparatus for determining eccentricity in tubular sections, anti-friction support means for supporting a section to-be-tested, drive means for continuously rotating said section about its axis, means connected in said drive means and operable for visually indicating torque variations during and incidental to the continuous rotation of the pipe, and means for removing each tested section from the anti-friction support means and replacing it with a section to-be-tested, said last named means being timed to operate through successive tubular section placing and removing cycles with a section testing interval intervening each two cycles, and including a pair of arms having two transversely spaced sets of longitudinally aligned notches in their upper surfaces each set disposed to support a tubular section, a rollway for supporting tubular sections in position for being rolled into one said notch set, rockable crank arm means supporting the arms at one end, rotary crank means supporting the arms at their other ends, means for operating said rotary crank means, a feed-away rollway disposed to receive tested tubular sections from the other notch set, said parts being so cooperatively arranged that upon each rotation of the crank means a tested tubular section will be lifted from the anti-friction support means by said other notch set and deposited onto the feed-away rollway and a tubular section to-be-tested will be lifted by said one notch set and deposited on said anti-friction support means.

HENRY G. FLOYD.

REFERENCES CITED

The following references are of record in the file of this patent:

UNITED STATES PATENTS

| Number | Name | Date |
|---|---|---|
| 3,145 | Allen | June 29, 1843 |
| 412,360 | Barclay | Oct. 8, 1889 |
| 1,557,956 | Zubaty | Oct. 20, 1925 |